United States Patent
Watanabe

(10) Patent No.: US 8,270,842 B2
(45) Date of Patent: Sep. 18, 2012

(54) OPTICAL SIGNAL PROCESSING DEVICE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 12/363,132

(22) Filed: Jan. 30, 2009

(65) Prior Publication Data

US 2009/0290882 A1 Nov. 26, 2009

(30) Foreign Application Priority Data

May 23, 2008 (JP) .................................. 2008-135835

(51) Int. Cl.
*H04B 10/00* (2006.01)
(52) U.S. Cl. ........................................................ 398/152
(58) Field of Classification Search .................... 372/22, 372/29.011; 398/180, 178, 65; 359/337.2
See application file for complete search history.

(56) References Cited

U.S. PATENT DOCUMENTS

| | | | |
|---|---|---|---|
| 6,091,539 A * | 7/2000 | Kosaka | 359/341.41 |
| 7,068,699 B2 * | 6/2006 | Nettleton et al. | 372/92 |
| 7,450,298 B2 | 11/2008 | Watanabe | |
| 2006/0051100 A1 | 3/2006 | Watanabe | |
| 2007/0230518 A1 | 10/2007 | Watanabe | |
| 2010/0103505 A1* | 4/2010 | McKinstrie et al. | 359/330 |

FOREIGN PATENT DOCUMENTS

| | | |
|---|---|---|
| JP | 2006-184851 | 7/2006 |
| JP | 2007-264319 | 10/2007 |
| JP | 2008-15152 | 1/2008 |

OTHER PUBLICATIONS

A. Borgis et al., "40 Gb/s All-optical Regeneration Based on the Pump Depletion Effect in Fiber Parametric Amplification", Optical Fiber Technology, vol. 14, No. 1, Dec. 2007, pp. 63-71.
K. Inoue et al., "Experimental Study on Noise Characteristics of a Gain-Saturated Fiber Optical Parametric Amplifier", Journal of Lightwave Technology, vol. 20, No. 6, Jun. 1, 2002, pp. 969-974.
European Search Report dated Aug. 27, 2009 and issued in corresponding European Patent Application 09151498.4.
European Office Action dated Mar. 6, 2012 issued in corresponding European Patent Application No. 09151498.4.

* cited by examiner

*Primary Examiner* — Yuanda Zhang
*Assistant Examiner* — Tuan Nguyen
(74) *Attorney, Agent, or Firm* — Staas & Halsey LLP

(57) ABSTRACT

Signal light, pumping light and control light having different wavelengths are input to a nonlinear optical medium. The power of the pumping light is controlled to generate a desired gain in the nonlinear optical medium. The power of the control light is controlled to saturate the gain of the nonlinear optical medium.

11 Claims, 18 Drawing Sheets

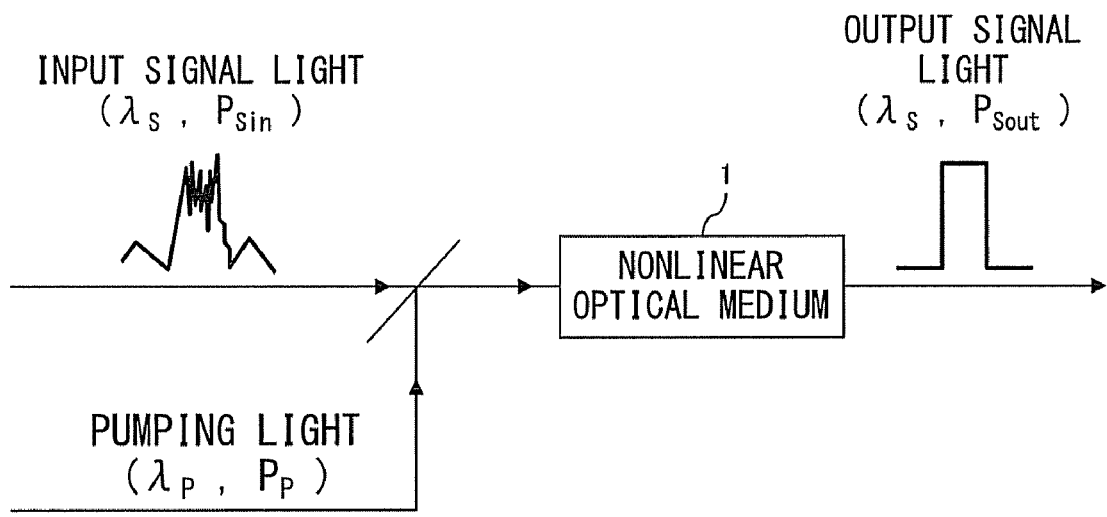
F I G. 1

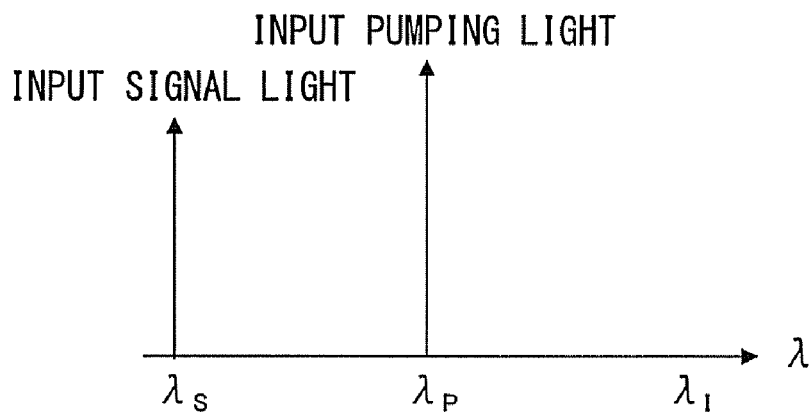
F I G. 2A
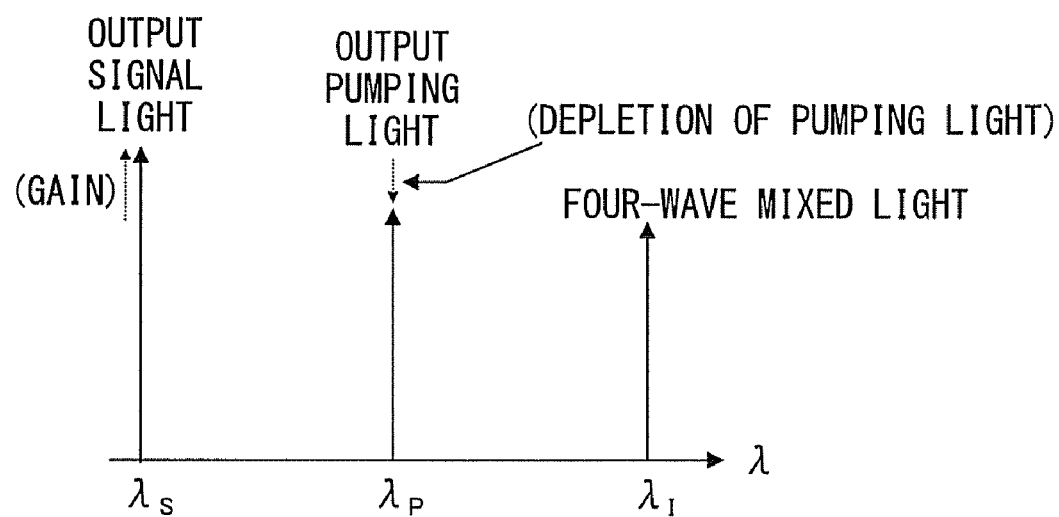
F I G. 2B

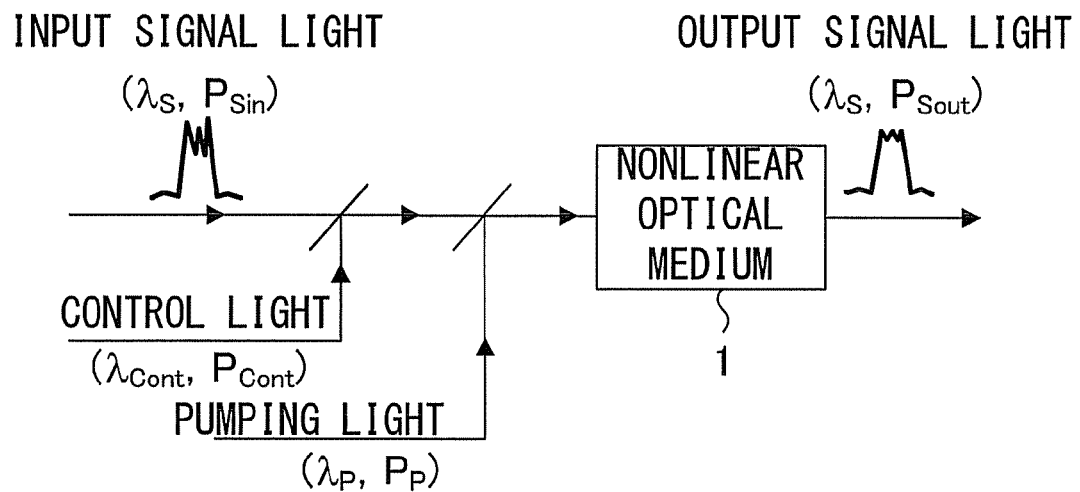
F I G. 3

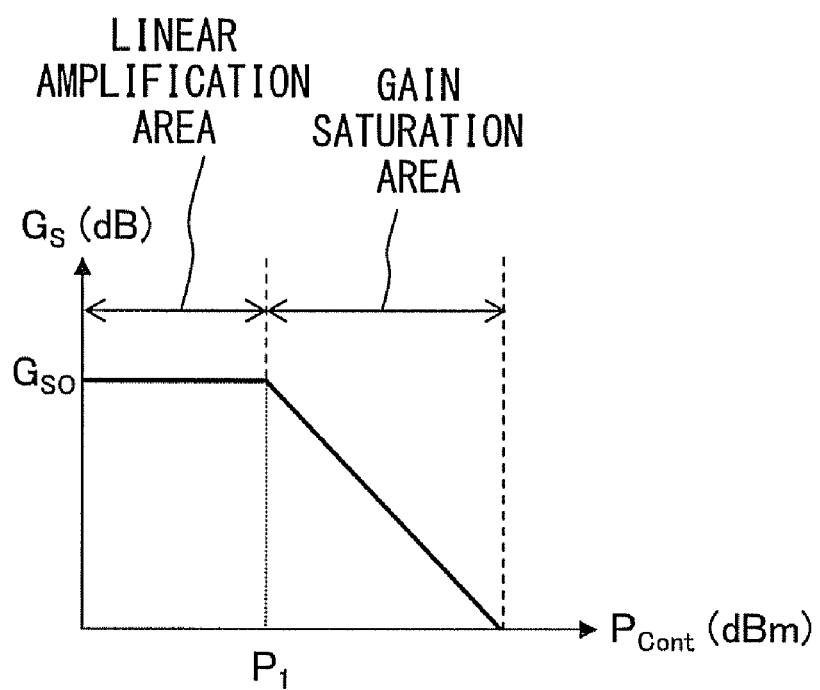
F I G. 4

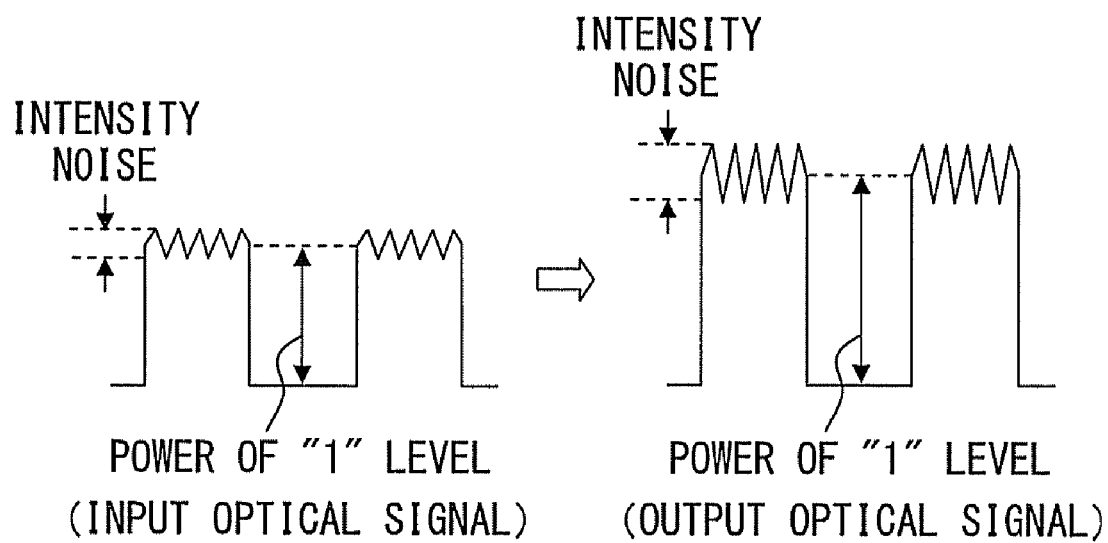
F I G. 5

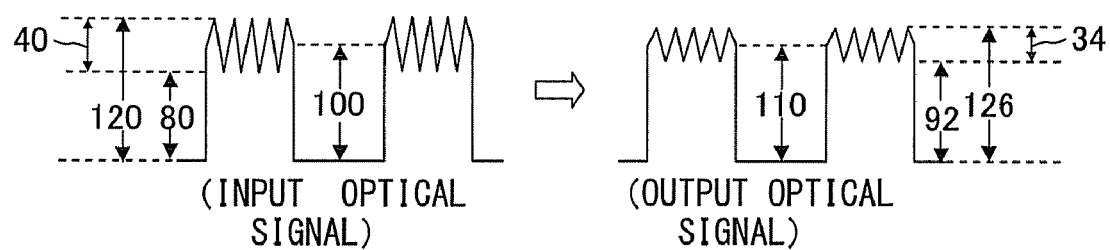
F I G. 6

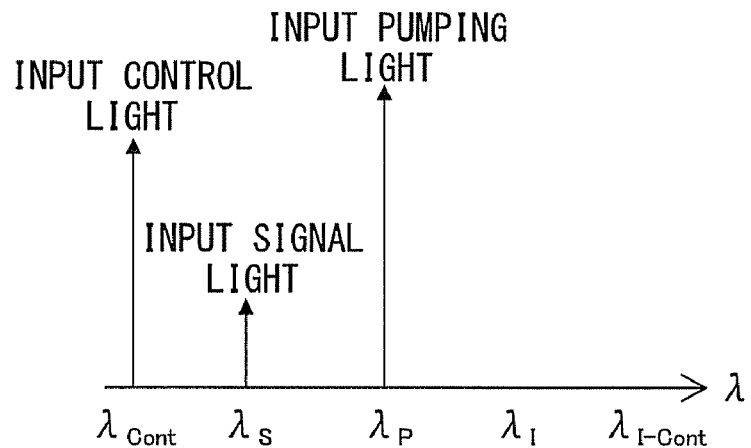
F I G. 7A
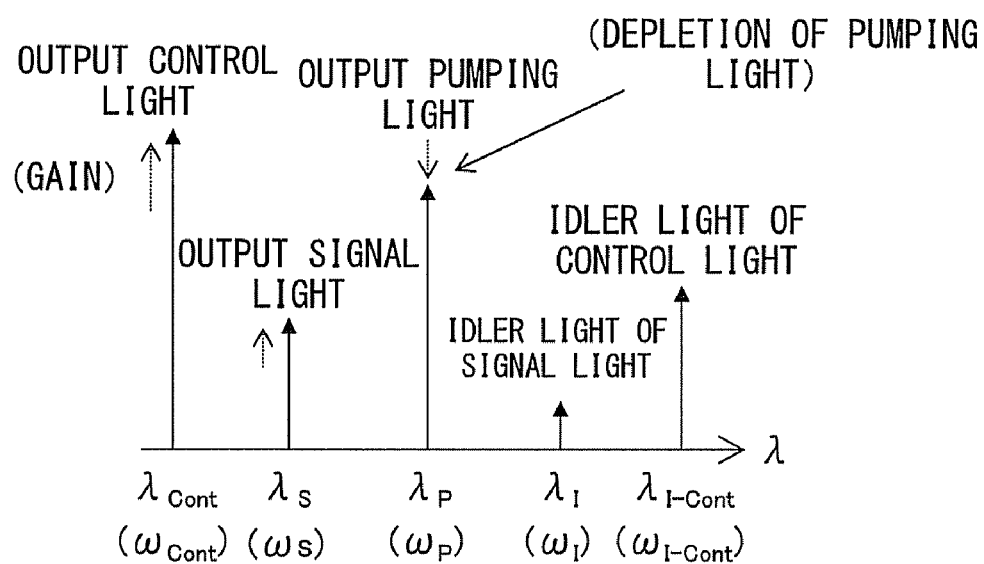
F I G. 7B

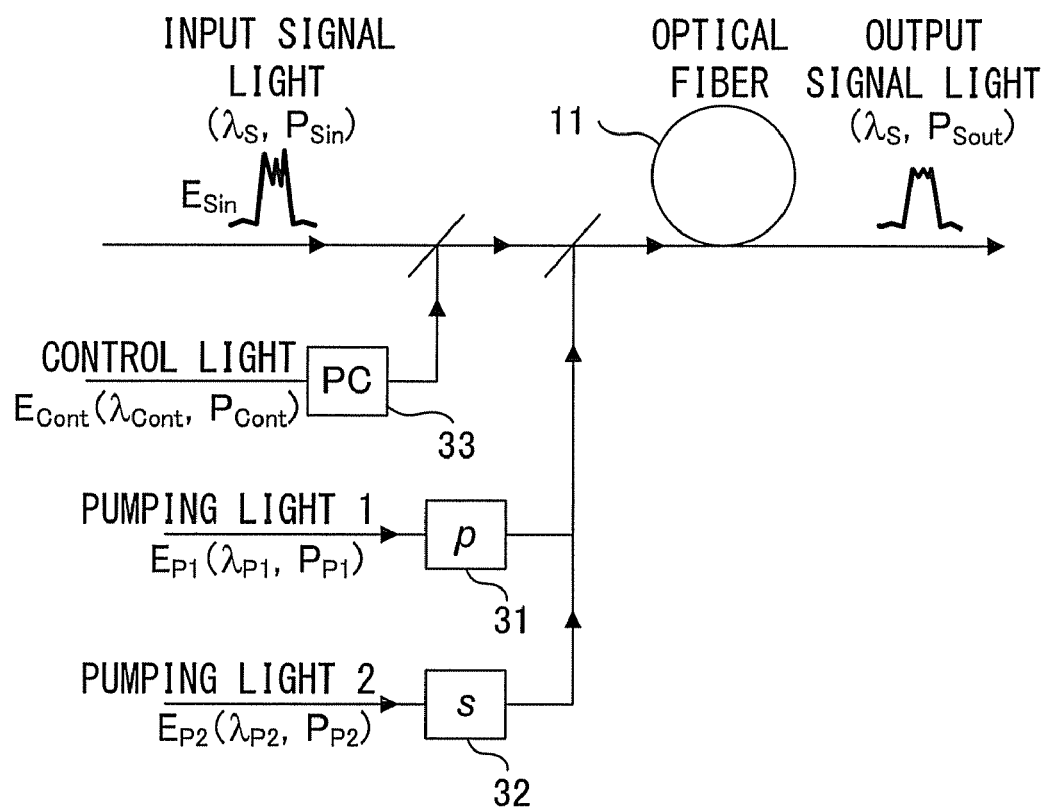
F I G. 1 1

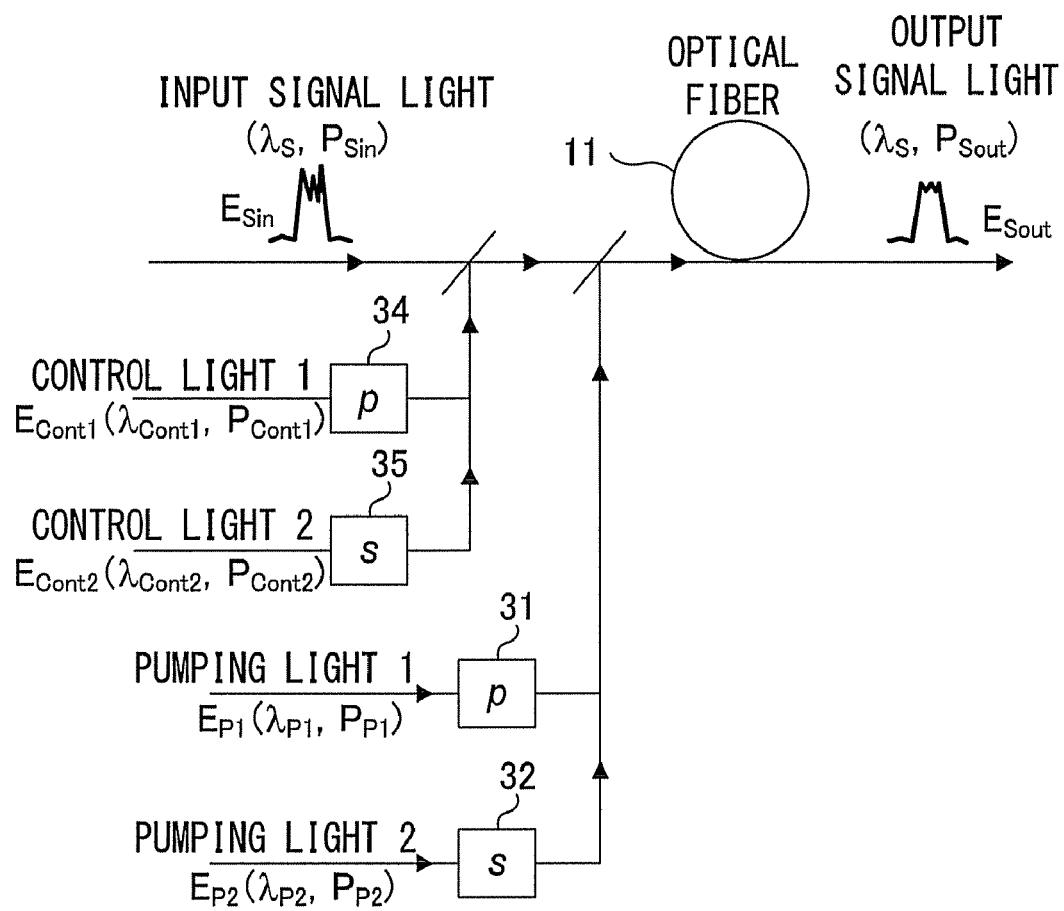
F I G. 1 3

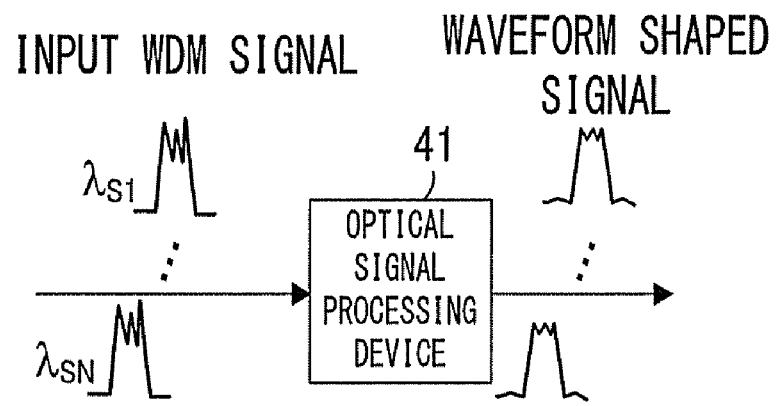
F I G. 1 4

OPTICAL SIGNAL PROCESSING DEVICE

CROSS-REFERENCE TO RELATED APPLICATIONS

This application is based upon and claims the benefit of priority of the prior Japanese Patent Application No. 2008-135835, filed on May 23, 2008, the entire contents of which are incorporated herein by reference.

FIELD

The present invention relates to an optical signal processing device. The present invention may be applied to, for example, a device for shaping the waveform of an optical signal, or a device for improving the quality of an optical signal.

BACKGROUND

In an optical communication system, the limit of a transmission speed (bit rate of data) or total data transmission capacity (transmission speed per channel×number of channels), and a possible transmission distance depend on the optical S/N ratio (optical signal-to-noise ratio) and the waveform distortion and phase distortion of an optical signal. The waveform distortion and the phase distortion of an optical signal mainly depend on the chromatic dispersion (including higher-order dispersion) of transmission line optical fiber, a nonlinear optical effect, etc. In addition, the optical S/N ratio depends on the noise of amplified spontaneous emission (ASE) generated in an optical amplifier for compensating for a loss of optical fiber and the noise characteristic of a transmitter or a receiver.

There are the following techniques of compensating for the waveform distortion of an optical signal by chromatic dispersion.
(1) A transmission line alternately having normal dispersion fiber and anormalous dispersion fiber.
(2) A chromatic dispersion compensator such as a dispersion compensation fiber, etc.
(3) A configuration of performing electric signal processing after converting a received optical signal into an electric signal.

Up to now, there has been the development of an optical fiber transmission system for transmitting 10 Gbps data while compensating for a transmission loss using an optical amplifier. In addition, the development of a higher speed long distance data transmission (for example, 40 Gbps, 160 Gbps) and the development of a method for providing system margin capable of expanding for a photonic network have moved forward.

However, even the high-precision dispersion compensation and a high-quality optical amplifier are combined, waveform distortion remains and there occurs serious degradation of an optical S/N ratio due to ASE noise generated by the optical amplifier. Therefore, a practical transmission distance is limited. As a result, to realize a long-distance optical fiber transmission of a high-speed signal, there is a demand to realize an optical signal recovery device equipped with the technology of shaping a distorted optical waveform, correcting phase distortion, and suppressing accumulated ASE noise, phase noise, etc.

Well known as a related technique is an optical switch provided with a polarization controller, a nonlinear optical medium, and a polarizer. A polarization controller controls the direction of polarization of optical signal. The optical signal, the polarization of which is controlled by the polarization controller, is input to the nonlinear optical medium. The polarizer is provided at the output side of the nonlinear optical medium, and has a polarization axis orthogonal to the direction of polarization of the optical signal output from the nonlinear optical medium. The optical signal is parametrically amplified by a control light pulse in the direction of polarization of the control light pulse in the nonlinear optical medium. Thus, the optical signal of overlapping with the control light pulse in the nonlinear optical medium passes through the polarizer.

Known as technology of shaping the waveform of an optical signal is an optical waveform shaping device having first and second power controllers and a nonlinear optical medium. The first power controller controls the power of optical signal. The second power controller controls the power of the pumping light having a wavelength different from the wavelength of the optical signal. The power-controlled optical signal from the first power controller and the power-controlled pumping light from the second power controller are input to the nonlinear optical medium. Then, the first power controller controls the power of the optical signal so that the gain by the pumping light is saturated in the nonlinear optical medium. Thus, the function of an optical limiter is realized, and an optical waveform is shaped.

These techniques are disclosed by, for example, Japanese Laid-open Patent Publication No. 2006-184851 and Japanese Laid-open Patent Publication No. 2007-264319.

In the prior art technology, a system has mainly been supposed to have substantially constant input power of optical signal, or transmit data of with a single wavelength. Therefore, in the prior art technology, when the input power of optical signal fluctuates, the waveform of the optical signal is not completely shaped. Additionally, an optical signal processing device for collectively processing the waveforms of a plurality of optical signals transmitted in wavelength division multiplexing (WDM) light has not been realized. In the WDM system, when the number of channels to be multiplexed changes, the power of the WDM light changes accordingly.

SUMMARY

An optical signal processing device according to one aspect of the present invention includes: a nonlinear optical medium, to which signal light, pumping light, and control light being input; a first power controller, provided at an input side of the nonlinear optical medium, for controlling power of the pumping light to obtain a predetermined gain in the nonlinear optical medium; and a second power controller, provided at an input side of the nonlinear optical medium, for controlling power of the control light to saturate the gain by the pumping light in the nonlinear optical medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration of the optical signal processing device according to the related art;
FIGS. 2A and 2B are explanatory views of depletion;
FIG. 3 is a configuration of the optical signal processing device according to the embodiments;

FIG. 4 illustrates the relationship between the gain of a nonlinear optical medium and control light;

FIG. 5 is an explanatory view of the operation performed when a nonlinear optical medium is used in a linear amplification area;

FIG. 6 is an explanatory view of the operation performed when a nonlinear optical medium is used in a gain saturation area;

FIGS. 7A and 7B illustrate the wavelength allocation in the optical signal processing device according to the embodiments;

FIG. 11 is the optical signal processing device according to the second embodiment;

FIG. 13 is a configuration of the optical signal processing device according to the third embodiment;

FIG. 14 is a configuration of processing WDM light;

DESCRIPTION OF EMBODIMENTS

Description of the Related Art

Figure 8:
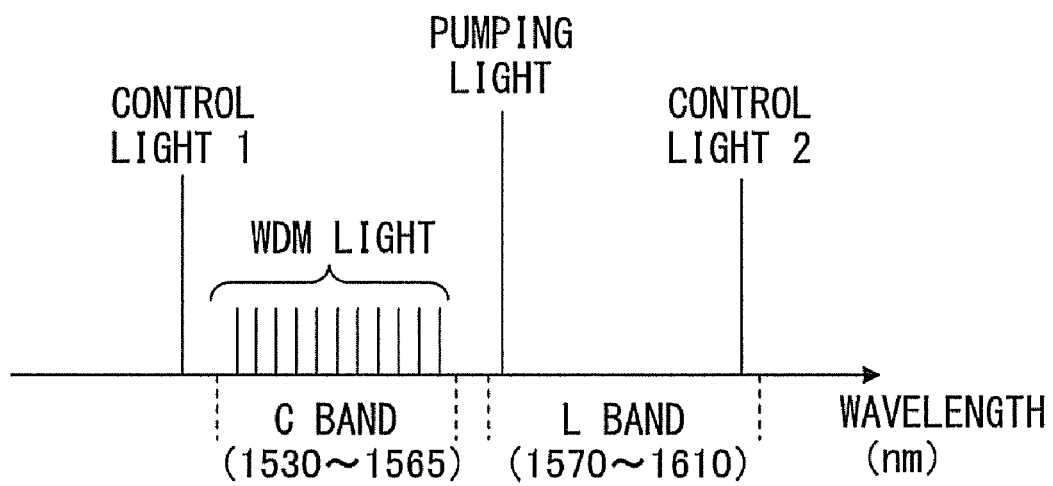
FIG. 8 is an embodiment of the wavelength allocation when the signal light is WDM light.

FIG. 1 illustrates a configuration of the optical waveform shaping device relating to an optical signal processing device according to the embodiments of the present invention. The related art is disclosed by, for example, the above-mentioned Japanese Laid-open Patent Publication No. 2007-264319.

In FIG. 1, a nonlinear optical medium 1 receives signal light and pumping light. The signal light carries optical signal (s). The wavelength of the signal light input to the nonlinear optical medium 1 is "$\lambda_s$". The input power of the signal light is "$P_{Sin}$". The wavelength of the pumping light is "$\lambda_p$" different from the wavelength of the signal light. The input power of the pumping light is "$P_p$". The signal light is amplified by the pumping light in the nonlinear optical medium 1. The wavelength of the signal light output from the nonlinear optical medium 1 is the same as the wavelength of the signal light, that is, "$\lambda_s$", input to the nonlinear optical medium 1. Provided as necessary at the output side of the nonlinear optical medium 1 is an optical bandpass filter for extracting the wavelength component of the signal light from the output light of the nonlinear optical medium 1. The optical filter for extracting the signal light can be a band reject filter etc. for cutting off the wavelength component (such as pumping light etc.) other than the signal light.

If the nonlinear optical medium 1 is third-order or second-order nonlinear optical medium, an optical parametric effect such as four-wave mixing (FWM) or three-wave mixing (TWM) occurs by the pumping light in the nonlinear optical medium 1, and the signal light is parametrically amplified. The gain of the optical parametric amplification is constant regardless of $P_s$ when the pumping light power $P_p$ is sufficiently higher than the signal light power $P_s$. However, if $P_s$ becomes large and $P_p$ is not sufficiently larger than $P_s$, the pumping light power exhausted to generate the optical parametric effect becomes large. Then, "depletion" in which the pumping light power $P_p$ attenuates in the nonlinear optical medium 1 occurs.

FIGS. 2A and 2B are explanatory views of depletion. As illustrated in FIG. 2A, it is assumed that the signal light with the wavelength $\lambda_s$ and the pumping light with the wavelength $\lambda_p$ are input to the optical fiber as the nonlinear optical medium 1. The pumping light wavelength $\lambda_p$ can be longer or shorter than the signal light wavelength $\lambda_s$.

In the interaction between the signal light and the pumping light, idler light (wavelength $\lambda_I$) corresponding to the signal light is generated by, for example, four-wave mixing as illustrated in FIG. 2B. In the four-wave mixing, the power of the signal light and the idler light is amplified. At this time, a part of the energy of the pumping light is transferred almost equally to the signal light and the idler light. The frequency ($\omega_s$ of signal light, the frequency $\omega_p$ of pumping light, and the frequency $\omega_I$ of idler light satisfy the following relationship.

$$\omega_p - \omega_I = \omega_s - \omega_p \neq 0$$

For example, when an optical fiber is used as the nonlinear optical medium 1, the length of the optical fiber is "L", and the loss is "$\alpha$". In the optical fiber, it is assumed that the polarization state of all light waves is identical, and the input power $P_p$ of the pumping light is sufficiently larger than the signal light power and the idler light power. For example, if the wavelength $\lambda_p$ of the pumping light is adjusted to the zero dispersion wavelength $\lambda_0$ of the optical fiber, then the signal light output from the optical fiber approximately obtains a gain Gs expressed in the following equation (1).

$$G_S = \exp(-\alpha L)[1 + \phi^2(L)] \tag{1}$$

$$\phi(L) = \gamma P_P(0) l(L) \tag{2}$$

$$\gamma = \frac{\omega n_2}{c A_{eff}} \tag{3}$$

"$\Phi(L)$" indicates a nonlinear optical phase shift. "$P_p(0)$" indicates the input power of pumping light.

$$l = (1 - e^{-\alpha L})/\alpha L$$

indicates the effective length of interaction. "$\gamma$" indicates a third-order nonlinear coefficient. "$n_2$" and "$A_{eff}$" respectively indicate a nonlinear refractive index and effective cross-sectional area of the optical fiber.

As expressed by the equations (1) through (3) above, the optical parametric gain Gs nonlinearly changes with respect to the value of the product of the nonlinear constant, the input power of pumping light, and the effective length of the interaction. Especially, when the linear phase matching condition ($\lambda_p = \lambda_0$) is satisfied, Gs is proportional to the square of the value of the product above as expressed by the equation (1) above. The generation efficiency of the optical parametric effect largely depends on the polarization states of the light waves to be interacted. Practically, when the polarization states of the light waves input to the optical fiber are the same, the generation efficiency of the four-wave mixing is the highest, and when the polarization states of the light waves are orthogonal to each other, the four-wave mixing hardly occurs. Therefore, when the input power of the pumping light is sufficiently large, the signal light is selectively and parametrically amplified in the same direction of polarization as the pumping light.

In the model above, the input power of the signal light input to the optical fiber is enhanced into the state in which the pumping light power $P_p$ is not sufficiently larger than the signal light power. Then, the optical gain Gs is gradually saturated (that is, decreases). Especially, if the pumping light power Pp is consumed by the generation of the optical parametric effect and the pumping light power itself is reduced into the so-called "depletion" state, then the optical gain rapidly becomes saturated.

If the depletion of the pumping light occurs in the nonlinear optical medium 1, the gain in the nonlinear optical medium 1 is saturated (that is, decreases). As a result, although the input power of signal light is increased, the signal light power output from the nonlinear optical medium 1 does not become higher than a predetermined level, and the nonlinear optical medium 1 functions as an optical limiter amplifier. In the optical limiter amplifier, the output power is constant although the power of the input signal light fluctuates. Therefore, optical waveform shaping capable of suppressing (especially suppressing the noise of level "1") intensity noise with which the intensity of an optical signal fluctuates can be realized. The intensity noise is also referred to as amplitude noise.

As described above, in the optical waveform shaping device according to the related art, an optical limiter amplifier can be realized by increasing the input power of signal light such that the depletion of the pumping light occurs. However, in the actual system, the above-mentioned condition may not be set. That is, generally, the input power of signal light is not constant, and may be smaller than pumping light power $P_p$. Especially, in the WDM system for transmitting a plurality of optical signals using different wavelengths, since the optical power of each channel is not equal to each other, the noise suppression effect may be different for each channel.

Outline of the Embodiments

The optical signal processing device according to the embodiments includes a nonlinear optical medium, a first power controller, and a second power controller. Signal light, pumping light, and control light having different wavelengths are input to the nonlinear optical medium. The first power controller, provided at the input side of the nonlinear optical medium, controls pumping light power so that a predetermined gain can be obtained in the nonlinear optical medium. The second power controller, provided at the input side of the nonlinear optical medium, controls the power of control light so that the gain by the pumping light can be saturated in the nonlinear optical medium.

In the optical signal processing device with the above-mentioned configuration, when the signal light (or WDM light) is amplified (for example, parametric amplification), an optical limiter amplifier operation can be realized by adjusting the power of the pumping light and the control light. By the optical limiter amplifier operation, the fluctuation of the amplitude of an optical signal is suppressed. That is, waveform shaping and/or suppression of amplitude noise is realized.

As described, in the optical signal processing device according to the embodiments, control light is input to the nonlinear optical medium to constantly realize an optical limiter amplifier operation without depending on the input power of signal light. That is, by the interaction between pumping light and control light, an optical limiter amplifier is realized. Then, by inputting signal light to the nonlinear optical medium functioning as an optical limiter amplifier, an optical limiter amplifier operation is realized for the signal light without depending on the input power of the signal light. Therefore, for an optical signal of each channel transmitted by WDM signal light, waveform shaping and noise suppression can be collectively realized.

The optical parametric amplification can be realized using the four-wave mixing etc. in the third-order nonlinear optical medium of optical fiber etc., and the three-wave mixing etc. in the second-order optical medium of an $LiNbO_3$ (periodically-poled LN) waveguide etc. of a polarized inverse structure (quasi phase matched structure).

Optical Signal Processing Device According to the Embodiments

FIG. 3 illustrates a configuration of the optical signal processing device according to the embodiments. In FIG. 3, signal light $E_s$, pumping light $E_p$, control light $E_{Cont}$ are input to the nonlinear optical medium 1. The wavelengths of the signal light, the pumping light, and the control light input to the nonlinear optical medium 1 are respectively "$\lambda_s$", "$\lambda_p$", and "$\lambda_{Cont}$". The wavelengths of the signal light, the pumping light and the control light are different from one another. The input power of the signal light, the pumping light, and the control light is "$P_{Sin}$", "$P_p$", and "$P_{Cont}$" respectively.

The input power of the signal light, the pumping light, and the control light are controlled by respective power controllers. The power controller is, for example, an optical amplifier or an optical attenuator. The wavelength of the signal light output from the nonlinear optical medium 1 is the same as the wavelength of the signal light, that is, "$\lambda_s$" input to the nonlinear optical medium 1. Provided as necessary at the output side of the nonlinear optical medium 1 is an optical bandpass filter for extracting the wavelength component of the signal light from the output light of the nonlinear optical medium 1. In addition, the polarization state of the pumping light can be adjusted using a polarization controller so that the efficiency of the nonlinear optical effect in the nonlinear optical medium 1 is optimum.

In the optical signal processing device with the configuration above, the signal light is amplified by the pumping light in the nonlinear optical medium 1. At this time, when the pumping light power $P_p$ is enlarged, an optical parametric gain can be obtained by an optical parametric effect. If the input power of signal light is "$P_{Sin}$" and the power gain is "G", the output power $P_{Sout}$ of the signal light is expressed by the following equation.

$$P_{Sout} = G \cdot P_{Sin}$$

If the gain G is larger than 1, the signal light power is amplified. For example, by using the optical fiber as the nonlinear optical medium 1 and adjusting the length of the optical fiber and the pumping light power $P_p$, a sufficiently large gain G can be obtained. At this time, an optical limiter amplifier capable of maintaining less fluctuated output power of the nonlinear optical medium 1 (or capable of suppressing the power fluctuation) can be realized by saturating the gain G. According to the optical limiter amplifier, for example, waveform shaping can be performed to suppress intensity noise. The response time of the optical parametric amplification in the optical fiber refers to a very short (about several femtoseconds order), and the waveform shaping of an ultra high speed signal exceeding tera bps can be expected.

FIG. 4 illustrates the relationship between the gain obtained in the nonlinear optical medium 1 and the control light. In this example, it is assumed that the pumping light power is constant. When the control light power $P_{Cont}$ is small, the gain (for example, an optical parametric gain) Gs is constant ("$G_{S0}$" in FIG. 4). In this case, the signal light input to the nonlinear optical medium 1 is linearly amplified.

On the other hand, in an area where the control light power $P_{Cont}$ is larger than a threshold power $P_1$, the optical parametric gain Gs is saturated. That is, in an area where the control light power $P_{Cont}$ is larger than the threshold power $P_1$, the gain obtained in the nonlinear optical medium 1 is smaller than in the area where the control light power $P_{Cont}$ is smaller than the threshold power $P_1$.

In the optical signal processing device according to the embodiments, the nonlinear optical medium 1 is used in a gain saturation area by appropriately controlling the control light power. That is, the control light having power equal to or larger than the threshold power $P_1$ illustrated in FIG. 4 is input to the nonlinear optical medium 1. The power of the control light may be determined in such a way that a total power of the control light and the signal light is larger than the threshold power $P_1$ illustrated in FIG. 4.

FIG. 5 is an explanatory view of the operation performed when the nonlinear optical medium 1 is used in a linear amplification area. In this example, it is assumed that the pumping light power is constant. In addition, the control light power is controlled to be sufficiently smaller than the threshold power $P_1$ illustrated in FIG. 4. In this case, the optical signal carried by the signal light is linearly amplified. That is, if the optical signal is amplified by the gain G, the intensity noise on the optical signal is similarly amplified by the gain G. Therefore, no waveform shaping effect or noise suppression effect can be obtained.

FIG. 6 is an explanatory view of the operation performed when the nonlinear optical medium 1 is used in a gain saturation area. In this example, it is also assumed that the pumping light power is constant. In addition, the control light power is controlled to be equal to or exceeding the threshold power $P_1$. The values assigned in FIG. 6 indicate optical power. However, these values are assigned for explanation of the operation of the optical signal processing device according to the embodiments, and the preciseness or correctness is to be ignored.

In the example illustrated in FIG. 6, the power of the optical pulse signal carried by the signal light (or the power of the level "1" of an optical signal) is "100". The power of the optical pulse signal fluctuates in the range "80" to "120" by the intensity noise. That is, the level of the intensity noise is "40". In this example, the gain of the nonlinear optical medium 1 is saturated. Therefore, when the power of the optical signal becomes larger, the gain received by the optical signal correspondingly becomes smaller. For a simpler description in the example illustrated in FIG. 6, it is assumed that when the input power of an optical signal is "80", "100", and "120", the gains are respectively "1.15", "1.10", and "1.05". In this case, the power of the optical pulse signal output from the nonlinear optical medium 1 is "110". However, the amplification rate of the signal component having the input power larger than "100" is small, and the amplification rate of the signal component having the input power smaller than "100" is large. As a result, the power fluctuation of the optical pulse signal output from the nonlinear optical medium 1 is in the range "92" to "126". That is, the level of the intensity noise is suppressed to "34". When it is considered that the entire power is amplified to 1.1 times, the intensity fluctuation is reduced from "40" to "31".

As described, in the optical signal processing device according to the embodiments, the nonlinear optical medium 1 is controlled in the gain saturation state by inputting the control light in addition to the signal light and the pumping light. That is, the nonlinear optical medium 1 functions as an optical limiter amplifier. Then, the signal light is input to the nonlinear optical medium 1 controlled in the gain saturation state as described above. Therefore, the intensity noise of the signal light is suppressed regardless of the input power of signal light. That is, although input power of signal light is small, or although the power of each channel of WDM light is not equalized, the intensity noise of the signal light can be suppressed. Since the intensity noise is suppressed in the time area corresponding to "1" of the optical signal in this case, the waveform of the optical signal is shaped. By a similar effect, the fluctuation of the intensity can also be suppressed. As a result, the optical S/N ratio can be improved.

FIGS. 7A and 7B illustrate the wavelength allocation in the optical signal processing device according to the embodiments. In the embodiments, it is assumed that optical fiber as the third-order nonlinear optical medium is used as an example of a nonlinear optical medium. Then, the signal light, the pumping light, and the control light are input to the optical fiber. The signal light, the pumping light, and the control light are, for example, coupled by an optical coupler and input to optical fiber.

The wavelengths of the signal light, the pumping light, and the control light input to the optical fiber are respectively "$\lambda_s$", "$\lambda_p$", and "$\lambda_{Cont}$" as illustrated in FIG. 7A. The wavelengths of the signal light and the control light can be shorter or longer than the wavelength of the pumping light. In addition, the wavelength differences among the signal light, the pumping light, and the control light are not specifically restricted. The pumping light and the control light can be continuous wave (CW) light, or an optical pulse train. If the signal light is a WDM signal, one of the wavelengths in the WDM signal can be used as control light.

In the optical fiber, as illustrated in FIG. 7B, the signal light is amplified in the nonlinear interaction between the pumping light and the signal light, and the idler light (wavelength: $\lambda_I$) of the signal light is generated. Similarly, in the interaction between the pumping light and the control light, the control light is amplified and the idler light (wavelength: $\lambda_{I\text{-}Cont}$) of the control light is generated. The frequency $\omega_p$ of the pumping light, the frequency $\omega_s$ of the signal light, the frequency $\omega_I$ of the idler light of the signal light, the frequency $\omega_{Cont}$ of the control light, and the frequency $\omega_{I\text{-}Cont}$ of the idler light of the control light satisfy the following relationship.

$$\omega_p - \omega_I = \omega_s - \omega_p \neq 0$$

$$\omega_p - \omega_{I\text{-}Cont} = \omega_{Cont} - \omega_p \neq 0$$

The power of the control light is, for example, 10 to 100 percent of the pumping light power, and is controlled so that the gain of the optical fiber by the pumping light can be saturated. The signal light power is lower than the pumping light power.

FIG. 8 illustrates an embodiment of the wavelength allocation when the signal light is WDM light. In this example, the WDM light that transmits a plurality of optical signals is arranged in the C band. In this case, the pumping light is, for example, arranged around 1570 nm. Although the control light is not specifically restricted, for example, it is arranged on the shorter wavelength side of the C band, or the longer wavelength side of the L band. The control light can also be arranged at the shortest or longest wavelength of the WDM light.

The optical fiber as the nonlinear optical medium 1 is controlled in the gain saturation state by the control light as described above. Therefore, the intensity noise of the optical signals of a plurality of channels transmitted by the WDM light can be suppressed although the respective power is different. That is, the waveforms of a plurality of optical signals in the WDM light are collectively shaped.

First Embodiment

Figure 9:
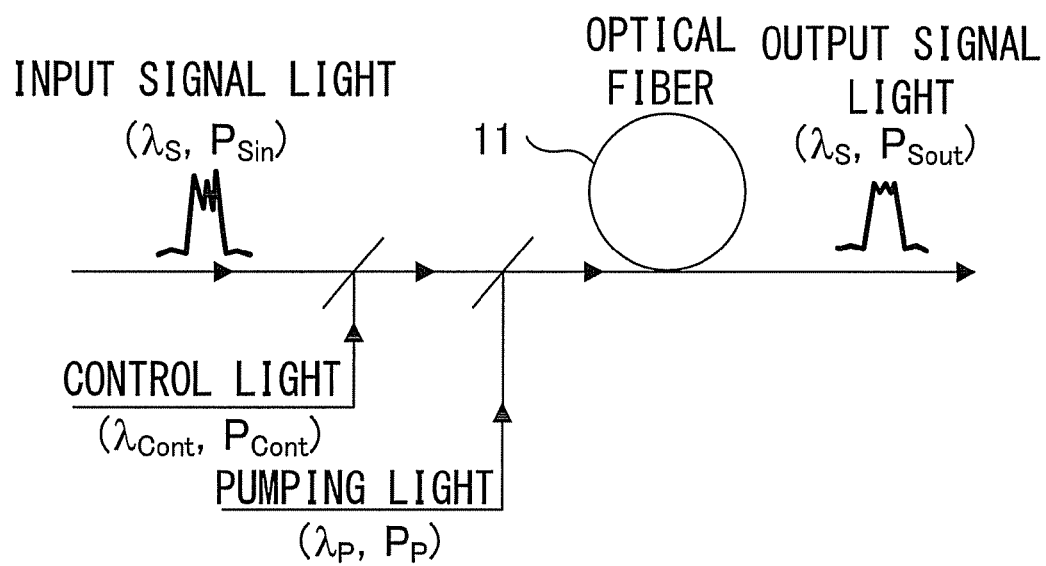
FIG. 9 is a configuration of the optical signal processing device according to the first embodiment.

FIG. 9 illustrates a configuration of the optical signal processing device according to the first embodiment. In the first embodiment, an optical fiber 11 is used as the nonlinear optical medium. The optical fiber is a nonlinear optical fiber.

The length of the optical fiber 11 is determined to obtain a desired optical parametric amplification efficiency or attain the optimum optical limiter effect. In addition, to reserve sufficiently broad band for optical parametric amplification, linear phase matching can be devised by arranging the pumping light wavelength ($\lambda_p$) to match or substantially match the zero dispersion wavelength ($\lambda_0$) of the optical fiber 11. Furthermore, the pumping light wavelength can be arranged in the longer wavelength side than the zero dispersion wavelength of the optical fiber 11, and phase matching can be devised using nonlinear phase shift. With these configurations, the optical parametric amplification efficiency can be improved.

As the optical fiber 11, for example, highly nonlinear fiber (HNLF) with enhanced nonlinear optical effect is effective. Additionally, for the optical fiber 11, the configuration in which the core is doped with germanium, bismuth, etc. to enhance a nonlinear refractive index, the configuration in which the optical power density is enhanced by decreasing a mode field, the configuration in which chalcogenide glass is used, and the configuration in which a photonic crystal fiber structure is used can be adopted.

As another nonlinear optical medium, a semiconductor optical amplifier of a quantum well structure, a semiconductor optical amplifier of a quantum dot structure, a silicon photonics waveguide, etc. can also be used. Furthermore, as a further nonlinear optical medium, a device for generating a second-order nonlinear optical effect such as three-wave mixing can be used. In this case, these devices can also use an $LiNbO_3$ waveguide (PPLN) having a quasi phase matched structure, a GaAlAs element, or a second-order nonlinear optical crystal, etc. Although a second-order nonlinear medium is used, it is desirable to have a configuration of a wavelength allocation capable of attaining phase matching.

The pumping light can be CW light or an optical pulse. When the pumping light is CW light, it is not necessary to perform timing control in response to the optical signal carried by the signal light. Therefore, the optical signal processing device can be realized by a simple configuration. However, the generation efficiency of a nonlinear optical effect depends on the peak power of the pumping light. Therefore, to reserve a sufficient gain, sufficiently amplified pumping light may be input to the optical fiber 11. Furthermore, when stimulated Burillouin scattering (SBS) occurs, the input pumping light is reflected, and the generation of optical parametric amplification is restricted. The SBS can be suppressed by expanding the spectrum of the pumping light. The expansion of the spectrum of the pumping light can be realized, for example, by performing phase modulation or frequency modulation with a frequency lower than the signal transmitted by the signal light.

When the pumping light is optical pulse, peak power can be easily enhanced. Therefore, a large gain can be realized. However, with the configuration, it is requested to match the timing between an optical signal and a pumping light pulse, thereby requiring a timing recovery circuit etc.

Figure 10:
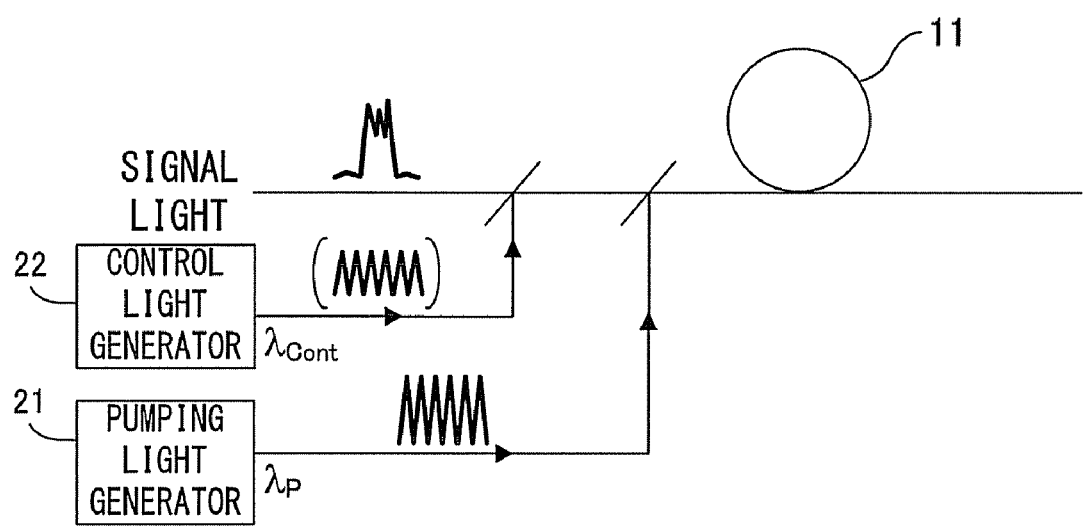
FIG. 10 is an embodiment of the configuration in which an optical pulse train is used as pumping light or control light.

To avoid the subject, as illustrated in FIG. 10, a configuration in which an optical pulse train with a repetition frequency sufficiently higher than the bit rate of an optical signal is used is considered. In FIG. 10, a pumping light generator 21 is a pulse laser light source, and generates an optical pulse train with the wavelength of $\lambda_p$. The repetition frequency of the optical pulse train is higher in speed than the bit rate of an optical signal. That is, an optical pulse train having a pulse width narrower than an optical signal transmitted by the signal light is used as the pumping light. The pumping light is generated by a semiconductor mode-locked laser or a fiber mode-locked laser oscillating at a desired repetition frequency. Otherwise, the pumping light can be generated by a $LiNBO_3$ intensity modulator or an electronic absorption (EA) modulator driven by electrical signal.

When the pumping light is an optical pulse train, it is preferable that the time average of a gain provided for an optical signal is substantially constant. In this case, a pumping light pulse can be generated at a predetermined interval or otherwise. That is, although the pulse is not synchronous with the timing of the optical signal, an optical parametric effect can be generated.

The control light also can be CW light or an optical pulse train. In the later case, a control light generator 22 generates an optical pulse train as described above. That is, an optical pulse train having a pulse width narrower than an optical signal transmitted by the signal light is used as the control light. Furthermore, the CW light can be used as the pumping light and the optical pulse train can be used as the control light. Otherwise, an optical pulse train can be used as the pumping light and the CW light can be used as the control light. Especially, when the CW light is used as the pumping light and the above-mentioned optical pulse train is used as the control light, the gain of the optical fiber 11 is saturated in the time domain where the optical pulse of the control light exists and the intensity noise is suppressed.

Second Embodiment

It is preferable that the optical signal processing device according to the embodiments functions independent of the polarization state of the input signal light. The second embodiment can solve the problem.

FIG. 11 illustrates a configuration of the optical signal processing device according to the second embodiment. In the second embodiment, a set of pumping light $E_{P1}$ and $E_{P2}$ are used. The wavelength and the power of the pumping light $E_{P1}$ is "$\lambda_{P1}$" and "$P_{P1}$". The wavelength and the power of the pumping light $E_{P2}$ is "$\lambda_{P2}$" and "$P_{P2}$". Although the wavelengths of the pumping light $E_{P1}$ and $E_{P2}$ may be different from each other, they are set to generate sufficient optical parametric effect for the signal light. In addition, the power of the pumping light $E_{P1}$ and $E_{P2}$ are equal or substantially equal to each other.

The set of pumping light $E_{P1}$ and $E_{P2}$ are controlled to be orthogonal to each other in the polarization state. That is, for example, a polarization controller 31 controls the pumping light $E_{P1}$ to the p polarization. On the other hand, a polarization controller 32 controls the pumping light $E_{P2}$ to the s polarization. Thus, a set of pumping light orthogonal to each other is generated and input to the optical fiber 11. With the configuration, an optical parametric amplification effect is obtained at a constant efficiency without depending on the polarization state of the input signal light.

Furthermore, a polarization controller 33 optimizes the polarization state of the control light $E_{Cont}$. For example, the control light $E_{Cont}$ is controlled by the polarization controller 33 as 45 degree linear polarization with respect to the p polarization pumping light and the s polarization pumping light. With the configuration, the control light $E_{Cont}$ receives a gain equally by the p polarization pumping light and the s polarization pumping light.

Application Example 1 of the Second Embodiment

Figure 12A:
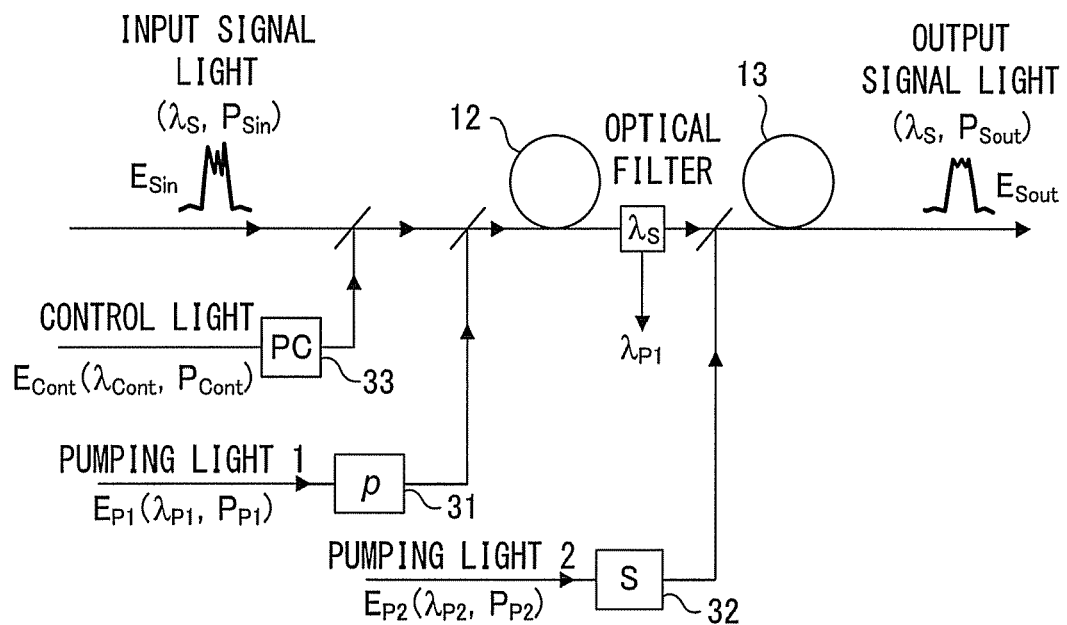
FIGS. 12A and 12B are examples of application of the second embodiment.

In the example illustrated in FIG. 11, the set of pumping light $E_{P1}$ and $E_{P2}$ orthogonal to each other avoid the polarization dependence. The signal processing device according to the second embodiment may be provided with optical fibers 12 and 13 having substantially the same characteristics and optically coupled in series, as illustrated in FIG. 12A. In this case, for example, the pumping light $E_{P1}$ is input to the optical fiber 12. Then, the p polarization component is processed in the optical fiber 12. Similarly, the pumping light $E_{P2}$ is input to the optical fiber 13, and the s polarization component is processed in the optical fiber 13. Between the two optical fibers 12 and 13, an optical filter for cutting off the wavelength component other than the signal light, and an optical multiplexer for multiplexing the signal light and the pumping light $E_{P2}$ may be provided.

Application Example 2 of the Second Embodiment

Figure 12B:
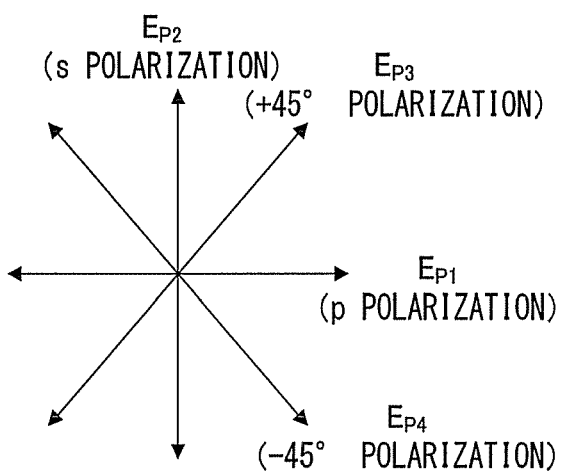

To generate sufficient gain saturation for all polarization states of the signal light, another set of pumping light orthogonal to each other in the polarization state in another direction may be used in addition to the above-mentioned set of pumping light. FIG. 12B illustrates a configuration of using the second set of pumping light $E_{P3}$ and $E_{P4}$ having a 45 degree direction of polarization with respect to the above-mentioned set of pumping light $E_{P1}$ and $E_{P2}$. For example, when the only set of pumping light $E_{P1}$ and $E_{P2}$ is used, the gain saturation for the signal in the 45 degree direction of polarization is relatively poor in the direction of polarization of the pumping light. However, by further using the pumping light $E_{P3}$ and $E_{P4}$ as in the present embodiment, sufficient gain saturation can be realized for the signal light in any polarization direction. If further pumping light in another polarization state is prepared, more sufficient gain saturation can be realized for all signal light.

Using the two above-mentioned application examples, the polarization-independent gain saturated optical parametric amplification, four-wave mixing, three-wave mixing, wavelength conversion, optical phase conjugate, etc. can be realized. In this case, the control light may not be required.

Third Embodiment

The third embodiment is a variation of the second embodiment. In the third embodiment, a set of pumping light $E_{P1}$ and $E_{P2}$ and a set of control light $E_{Cont1}$ and $E_{Cont2}$ are used as illustrated in FIG. 13. The wavelength and the power of the control light $E_{Cont1}$ are "$\lambda_{Cont1}$" and "$P_{Cont1}$" respectively. The wavelength and the power of the control light $E_{Cont2}$ are "$\lambda_{Cont2}$" and "$P_{Cont2}$" respectively. The wavelengths of the control light $E_{Cont1}$ and $E_{Cont2}$ may set to be different from each other, and may generate sufficient gain saturation for the signal light. The power of the control light $E_{Cont1}$ and $E_{Cont2}$ is the same or substantially the same as each other.

The polarization controllers 31 and 32 generate p polarization pumping light and s polarization pumping light as in the second embodiment. Polarization controllers 34 and 35 generate the p polarization control light and s polarization control light. That is, a set of control light in the same polarization state as a set of pumping light is generated.

Fourth Embodiment

In the fourth embodiment, as illustrated in FIG. 14, signal light in which a plurality of signals are wavelength division-multiplexed is input to an optical signal processing device 41. The optical signal processing device 41 is, for example, described with the first through third embodiments.

A plurality of optical signals transmitted by the WDM light are generally asynchronous with one another, and at random in the polarization state. Furthermore, a total of the peak power of each signal is not constant in a time domain. Therefore, in the prior art, each optical signal is separated from the WDM light for each channel (that is, for each wavelength), and then a waveform of each optical signal is shaped respectively.

On the other hand, in the optical signal processing device according to the embodiments, the intensity noise of an optical signal is suppressed and the waveform of the optical signal is shaped without an influence of the input power of signal light. Therefore, in the optical signal processing device according to the embodiments, the waveform of each optical signal can be shaped without demultiplexing the WDM light. One or a plurality of wavelengths in the WDM signal light can also be used as the above-mentioned control light. In this case, for example, a channel not to be waveform-shaped is used as the control light.

An optical bandpass filter, a center wavelength of the transmission band being around the center of WDM signal band can be provided at the output side of the optical signal processing device. In this case, for example, a configuration with an interleave filter, a fiber grating, etc. is effective. Additionally, it is also effective to use a band reject optical fiber for cutting off those other than a wavelength component of the WDM signal light at the output side of the optical signal processing device.

Application Example of the Fourth Embodiment

Figure 15:
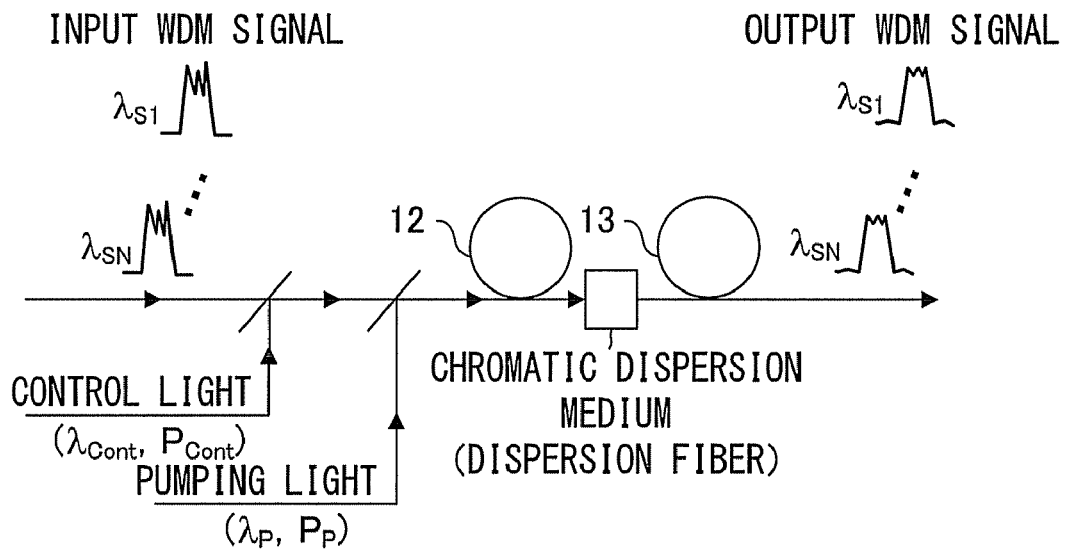
FIG. 15 is an example of an application according to the fourth embodiment.

A gain saturation depends on a total of the peak power of all channels in the WDM signal light. Therefore, to evenly generate gain saturation for all signals, it is effective to average the total of the peak power at the same timing. FIG. 15 illustrates an embodiment in which two optical fibers optically coupled in series are provided and a different delay is assigned to each wavelength between the optical fibers. The configuration of assigning a different delay to signal light having a different wavelength is realized by, for example, using a chromatic dispersion medium. It is realized by, for example, a dispersion fiber. For example, if wavelength difference between each channel is 10 nm in 100 Gbps WDM system, the averaging process can be performed by assigning a delay of 5 ps between the two channels. In this case, for example, about 25 m of optical fiber having chromatic dispersion of about 20 ps/nm/km can be used.

Using the above-mentioned application example, the polarization-independent linear optical parametric amplification, four-wave mixing, three-wave mixing, wavelength conversion, optical phase conjugate, etc. can be realized. In this case, the control light is not required.

Fifth Embodiment

In the optical signal processing device according to the embodiments, the phase of signal light is not affected by the amplifying process in the optical fiber 11. Therefore, the above-mentioned waveform shaping method can be applied to signal light modulated by optical intensity modulation, optical phase modulation, optical frequency modulation, etc.

Relating to the phase modulation optical signal, an optical limiter amplifier does not suppress phase noise itself, but reduces the intensity fluctuation, thereby effectively reducing the phase noise caused by the intensity fluctuation. Especially, in an optical fiber transmission, the nonlinear optical effect in the optical fiber converts the intensity noise into the phase noise (AM/PM conversion). The transmission limit of the phase modulation optical signal depends on the phase noise. Therefore, if the intensity noise is suppressed using the optical signal processing device according to the embodiments, the phase noise caused by the AM/PM conversion is also reduced, thereby improving the quality of the phase modulation optical signal. Furthermore, since the optical S/N ratio can be improved by the present embodiments, the optical signal can be transmitted with high quality.

The fluctuation of a zero level can be suppressed by, for example, arranging a saturable absorber at the input side or output side of the optical signal processing device according to the embodiments. The saturable absorber can be a semiconductor saturable absorber, a semiconductor amplifier, a fiber switch as a Mach-Zehnder interferometer, a switch as a nonlinear optical loop mirror (NOLM), etc.

Sixth Embodiment

Figure 16A:
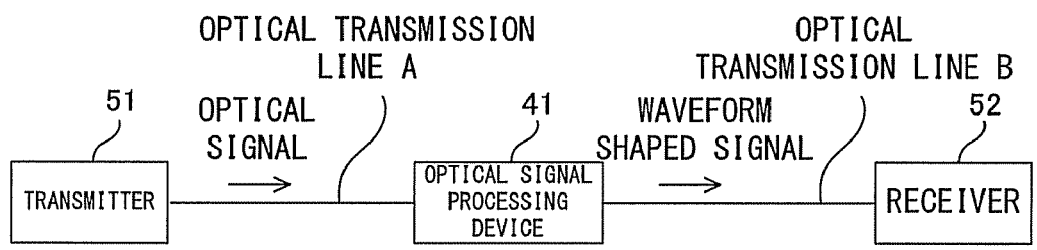
FIGS. 16A and 16B are configurations of communication systems using the optical signal processing device.

In the sixth embodiment, the optical signal processing device according to the embodiments is used in an optical communication system. In the embodiment illustrated in FIG. 16A, the optical signal processing device 41 is provided on an optical transmission line between a transmitter 51 and a receiver 52. In this case, the optical signal processing device 41 is provided in, for example, an optical repeater device. The optical signal processing device 41 shapes the waveform of the optical signal received from the optical transmission line A and directs the optical signal to the optical transmission line B. The optical transmission lines A and B can be configured to perform power amplification using an optical amplifier, or can be optimally designed to compensate for the chromatic dispersion of transmission line fiber.

Figure 16B:
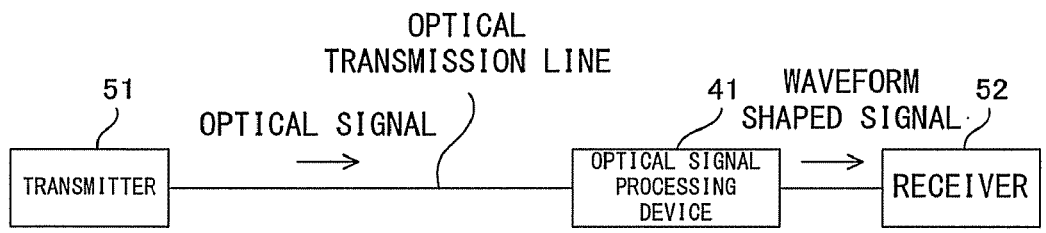

In the embodiment illustrated in FIG. 16B, the optical signal processing device 41 is provided near the receiver 52 (or in the receiver). In this case, the receiver 52 can receive an optical signal whose waveform has been shaped.

According to the sixth embodiment, the receiver sensitivity is improved and the transmission characteristic is enhanced. Specifically in an optical amplification relay and transmission system, the effects of reducing transmission power, extending the repeater interval of an optical amplifier, and decreasing the number of optical amplifiers can be expected.

Seventh Embodiment

Figure 17:
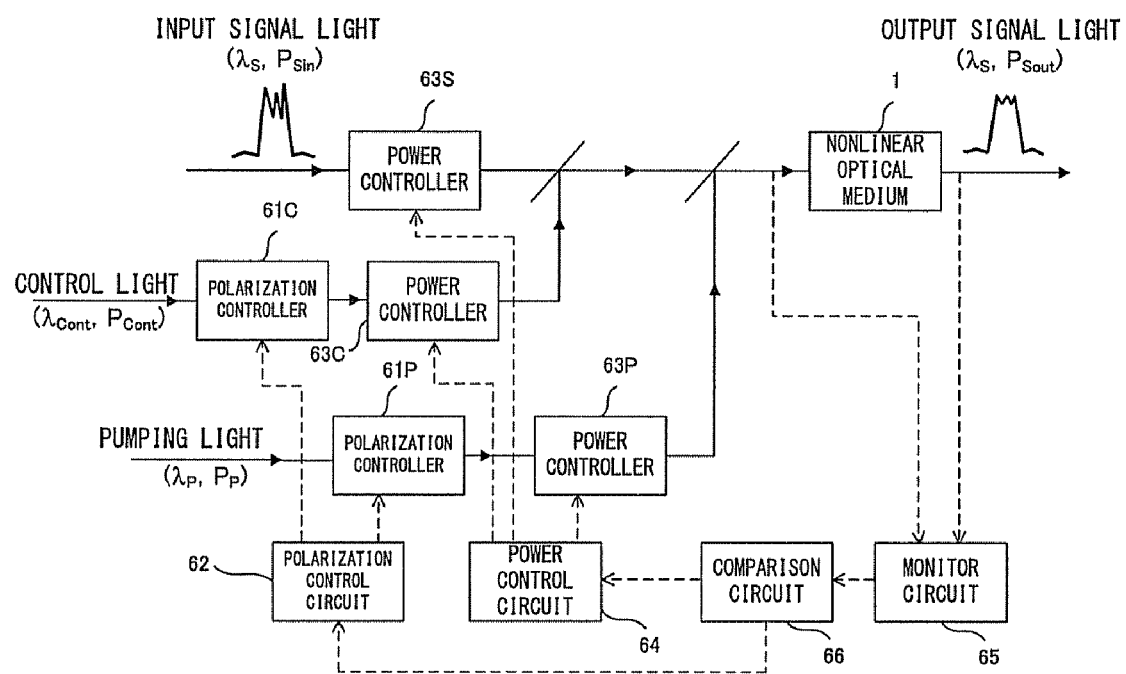
FIG. 17 is a configuration of the optical signal processing device provided with a feedback system.

FIG. 17 illustrates a configuration of the optical signal processing device provided with a feedback system. The nonlinear optical medium 1 is the second-order or third-order nonlinear optical medium ($\chi^{(2)}/\chi^{(3)}$), and realized by, for example, the above-mentioned optical fiber 11.

A polarization controller 61p controls the polarization state of the pumping light. A polarization controller 61c controls the polarization state of the control light. The polarization controllers 61c and 61p respectively control the polarization state of the control light and the pumping light according to instruction from the polarization control circuit 62. The polarization controllers 61c and 61p are realized by, for example, a wavelength plate polarization controller, a LiNbO$_3$ polarization controller, a stress-type polarization controller consisted of fiber squeezers, a Faraday rotor, etc.

A power controller 63s adjusts the power of input signal light. A power controller 63p adjusts the power of the pumping light whose polarization state has been controlled by the polarization controller 61p. A power controller 63c adjusts the power of the control light whose polarization state has been controlled by the polarization controller 61c. The power controllers 63c, 63p, and 63s respectively control the power of the control light, the pumping light, and the signal light according to instructions from the power control circuit 64. The power controllers 63c, 63p, and 63s are realized by, for example, an optical amplifier, and an optical attenuator (or a combination of the optical amplifier and the optical attenuator, etc.)

A monitor circuit 65 monitors the power of the signal light input to the nonlinear optical medium 1 and the power of the signal light output from the nonlinear optical medium 1. The monitor circuit 65 may include an optical filter for extracting the wavelength λs of the signal light, and a photo detector for detecting the signal light extracted by the filter.

A comparison circuit 66 calculates the gain in the nonlinear optical medium 1 on the basis of the input power and the output power of signal light at the nonlinear optical medium 1. The comparison circuit 66 compares the input power and/or the output power of the signal light with predetermined threshold power as necessary.

The polarization control circuit 62 refers to the output of the comparison circuit 66, and generates instructions to adjust the polarization state to the polarization controllers 61c and 61p. The power control circuit 64 refers to the output of the comparison circuit 66, and generates instructions to adjust the optical power to the power controllers 63c, 63p, and 63s.

Although not illustrated in the drawings, the optical signal processing device with the above-mentioned configuration is provided with a pumping light source, a control light source, and an optical band filter. The pumping light source generates the pumping light (CW light or optical pulse). The control light source generates the control light (CW light or an optical pulse). The optical band filter is an optical wavelength filter having the same transmission frequency as the wavelength of the signal light, and is provided at the output side of the nonlinear optical medium 1. The optical band filter extracts the wavelength component of the signal light from the output light of the nonlinear optical medium 1.

The polarization controllers 61c and 61p, and the power controllers 63c, 63p, and 63s are adjusted in, for example, the following procedure.

First, the states of the polarization controllers 61c and 61p are adjusted. The polarization states of the pumping light and the control light are adjusted so that a nonlinear optical effect can efficiently occur in the nonlinear optical medium 1. The nonlinear optical effect (especially four-wave mixing) occurs the most efficiently when the polarization states of the pumping light and the control light are the same. Therefore, the polarization controllers 61c and 61p may perform control so that the polarization states of the control light and the pumping light match each other. However, the present embodiments are not limited to the configuration, but the states of polarization of the pumping light and the control light can be different by a predetermined state.

Then, the power control circuit 64 adjusts the state of the power controller 63p. That is, the power of the pumping light is controlled to obtain a desired or sufficient optical parametric gain in the nonlinear optical medium 1. At this time, assume that the input power of the control light is small, and the power of the pumping light is sufficiently larger than the control light. That is, it is assumed that the power of the control light is smaller than the threshold power $P_1$ illustrated in FIG. 4.

Afterwards, the power of the control light is increased while the optical parametric gain in the nonlinear optical medium 1 is monitored. While the input power of the control light is smaller than the threshold power $P_1$ illustrated in FIG. 4, the optical parametric gain is substantially constant. However, when the power of the control light is further increased and becomes larger than the threshold power $P_1$, the optical parametric gain is saturated and decreases. Then, the power control circuit 64 terminates the adjustment of the power controller 63c when the optical parametric gain drops by a predetermined level.

The extent of the decrease of the optical parametric gain in the above-mentioned adjusting procedure depends on the level of the requested function of the optical limiter (that is, the waveform shaping function). For example, in a system in which it is assumed that the waveform of an input optical signal is relatively good, efficiently obtaining a gain is considered with a higher priority than obtaining a waveform shaping effect, and the optical parametric gain is reduced slightly. On the other hand, in a system in which it is assumed that the waveform of input optical signal is greatly degraded, an optical parametric gain is to be largely dropped to obtain a sufficient waveform shaping effect.

The input power of signal light is adjusted as necessary. For example, when the signal light is WDM light, the power controller 63s may be controlled to hold as a predetermined value obtained by dividing the total power of the WDM light by the number of channels. Furthermore, the optical signal output from the nonlinear optical medium 1 is monitored, and the power of the signal light, pumping light, and the control light may be feedback-controlled so that the quality (optical S/N ratio, Q value, bit error rate, etc.) of the output signal is optimized.

Eighth Embodiment

Figure 18A:
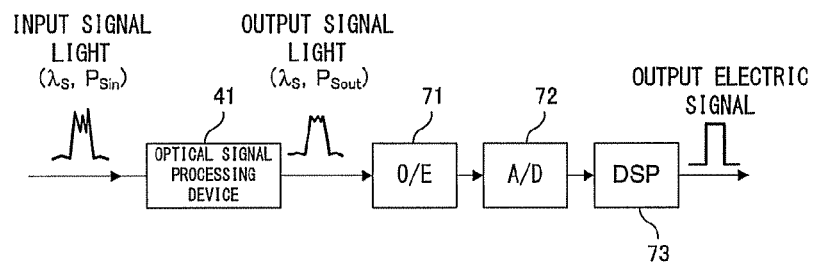
FIGS. 18A and 18B are configurations of the optical signal processing device including a DSP.

In the eighth embodiment, the throughput is improved using digital signal processing. With the configuration illustrated in FIG. 18A, an O/E converter 71, an A/D converter 72, and a digital signal processing processor (DSP) 73 are provided at the output side of the optical signal processing device 41. The O/E converter 71 converts the optical signal whose waveform has been shaped and intensity noise has been suppressed into an electric signal. The A/D converter 72 converts the signal output from the O/E converter 71 into a digital signal. The DSP 73 performs, for example, error correction using an error correction code (FEC), the process of estimating a received signal as a quantum code, the maximum likelihood sequence estimation, etc. At this time, the DSP 73 can convert a received signal into a quantum code, also perform a computer simulation, and also perform a sequential and approximate estimation.

Figure 18B:
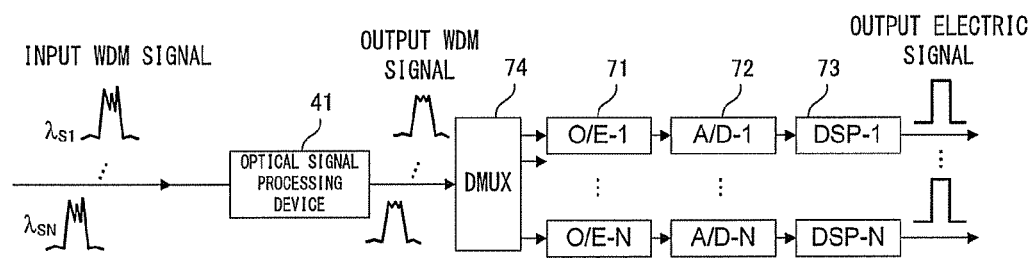

With the configuration shown in FIG. 18B, the WDM signal light is processed. In this case, a wavelength demultiplexer 74 is provided at the output side of the optical signal processing device 41. The wavelength demultiplexer 74 demultiplexes each optical signal transmitted by the WDM signal light. The O/E converter 71, the A/D converter 72, and the DSP 73 are provided for each optical signal. With the configuration, a plurality of signals are collectively processed in an optical domain. If the DSP 73 can collectively process all wavelengths, the wavelength demultiplexer 74 is not required, and it is not necessary to provide the OE converter and the A/D converter for each wavelength.

When signal processing is performed by the DSP 73, and if the quality of the optical signal output from the optical signal processing device 41 is good, then the amount of computation is reduced. For example, if the DSP 73 performs an error correcting process, and the quality of the optical signal is high, then an error rate becomes lower and the frequency of performing the error correcting operation is also lower. In addition, if the DSP 73 estimates data with the most likelihood sequence, and the quality of the optical signal is high, then the convergence time for estimation becomes shorter.

<Other Aspects>

The optical signal processing device according to the embodiments can be applied to a Raman amplifier. As well known, a gain is obtained in an area having a wavelength about 100 nm longer than the wavelength of the pumping light in the Raman amplification, and signal light (or WDM signal light) is arranged in the gain area. Therefore, when the Raman amplifier is used as the optical limiter amplifier, control light is arranged in or near the gain area. Then, the power of the control light is adjusted to saturate the Raman gain. With the configuration, the intensity noise is suppressed, and the waveform of the optical signal is shaped.

As described, the optical signal processing device according to the embodiments can shape the waveform of an optical signal and suppress noise without an influence of the input power of the optical signal.

In addition, according to the optical signal processing device of the embodiments, the waveforms of a plurality of optical signals transmitted by WDM light can be collectively shaped. Thus, the optical S/N ratio of the WDM optical signal is improved, and a high level request for the high-speed optical communication system (for example, high precision dispersion compensation etc.) is moderated, and the optical network can be realized with high performance at a lower cost. Further, according to the embodiments, an optical signal process for suppressing the intensity fluctuation or intensity noise of intensity modulated optical signal, phase modulated optical signal, and frequency modulated optical signal can be performed. Furthermore, the power consumption in an optical network can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical signal processing device, comprising:
 a nonlinear optical medium, to which signal light, pumping light, and control light being input;
 a first power controller, provided at an input side of the nonlinear optical medium, to control power of the pumping light to obtain a predetermined gain in the nonlinear optical medium;
 a monitor unit to monitor input power of the signal light input to the nonlinear optical medium and output power of the signal light output from the nonlinear optical medium, and
 a second power controller, provided at an input side of the nonlinear optical medium, to control power of the control light to saturate the gain by the pumping light in the nonlinear optical medium, the second power controller increasing the power of the control light until the gain in the nonlinear optical medium calculated from the input power and the output power of the signal light drops.

2. The optical signal processing device according to claim 1, wherein the signal light is WDM light transmitting a plurality of optical signals.

3. The optical signal processing device according to claim 2, further comprising an optical filter, provided at an output side of the nonlinear optical medium, for passing a wavelength band of the WDM light.

4. The optical signal processing device according to claim 2, wherein: the nonlinear optical medium comprises two optical fibers; and a chromatic dispersion is added between the two optical fibers.

5. The optical signal processing device according to claim 1, wherein the pumping light is an optical pulse train having a pulse width narrower than an optical signal transmitted by the signal light.

6. The optical signal processing device according to claim 1, wherein the control light is an optical pulse train having a pulse width narrower than an optical signal transmitted by the signal light.

7. The optical signal processing device according to claim 1, further comprising a polarization controller to generate a set of linear polarization orthogonal to each other as the pumping light.

8. The optical signal processing device according to claim 7, wherein the control light is 45 degree linear polarization with respect to the pumping light.

9. The optical signal processing device according to claim 1, further comprising:
a first polarization controller to generating as the pumping light a set of linear polarization pumping light orthogonal to each other; and
a second polarization controller to generating as the control light a set of linear polarization control light in a same polarization state as the set of linear polarization pumping light obtained by the first polarization controller.

10. The optical signal processing device according to claim 1, further comprising
a saturable absorber medium provided at an input side or an output side of the nonlinear optical medium.

11. A method of processing an optical signal, comprising:
inputting signal light, pumped light, and control light to a nonlinear optical medium;
monitoring a gain by the pumping light by a monitor unit on a basis of input power of the signal light input to the nonlinear optical medium and output power of the signal light output from the nonlinear optical medium;
controlling the power of the pumping light, by a first power controller provided at an input side of the nonlinear optical medium, to obtain a desired gain; and
controlling the power of the control light to saturate the gain by a second power controller provided at the input side of the nonlinear optical medium.

* * * * *

UNITED STATES PATENT AND TRADEMARK OFFICE
CERTIFICATE OF CORRECTION

PATENT NO. : 8,270,842 B2
APPLICATION NO. : 12/363132
DATED : September 18, 2012
INVENTOR(S) : Shigeki Watanabe It is certified that error appears in the above-identified patent and that said Letters Patent is hereby corrected as shown below:

Column 18, Line 3, In Claim 9, delete "to generating" and insert -- to generate --, therefor.
Column 18, Line 6, In Claim 9, delete "to generating" and insert -- to generate --, therefor.

Signed and Sealed this
Twentieth Day of November, 2012

David J. Kappos
*Director of the United States Patent and Trademark Office*